United States Patent
Yeh

(10) Patent No.: US 9,281,710 B2
(45) Date of Patent: Mar. 8, 2016

(54) BYPASS CONTROL WIRELESS CHARGING DEVICE

(71) Applicant: Ming-Hsiang Yeh, Taipei (TW)

(72) Inventor: Ming-Hsiang Yeh, Taipei (TW)

(*) Notice: Subject to any disclaimer, the term of this patent is extended or adjusted under 35 U.S.C. 154(b) by 204 days.

(21) Appl. No.: 14/084,653

(22) Filed: Nov. 20, 2013

(65) Prior Publication Data

US 2014/0152248 A1 Jun. 5, 2014

(30) Foreign Application Priority Data

Nov. 30, 2012 (TW) .............................. 101223193 U

(51) Int. Cl.
*H02J 7/00* (2006.01)
*H02J 7/02* (2006.01)

(52) U.S. Cl.
CPC ...................................... *H02J 7/025* (2013.01)

(58) Field of Classification Search
CPC ........... H02J 7/007; H02J 7/0021; H02J 7/00; H02J 2007/0095; H02J 5/005; H02J 7/0036; H02J 7/025
USPC ........................................................ 320/108
See application file for complete search history.

(56) References Cited

U.S. PATENT DOCUMENTS

| | | | | |
|---|---|---|---|---|
| 2008/0136353 A1* | 6/2008 | Hsu | ....................... | G09G 3/3406 315/307 |
| 2013/0162201 A1* | 6/2013 | Yeh | ......................... | H02J 7/025 320/108 |
| 2013/0175981 A1* | 7/2013 | Yeh | ......................... | H02J 7/025 320/108 |
| 2014/0097790 A1* | 4/2014 | Yeh | .............................. | 320/108 |
| 2014/0152249 A1* | 6/2014 | Yeh | .............................. | 320/108 |

* cited by examiner

*Primary Examiner* — Nghia Doan
(74) *Attorney, Agent, or Firm* — Bacon & Thomas, PLLC

(57) ABSTRACT

A bypass control wireless charging device includes a logic control unit electrically connected to a wireless transmission unit, a full-bridge inverter, a buck-boost unit, a discharging switch unit and a back current prevention unit, wherein the discharging switch unit electrically connected to a battery, and a inlet terminal of the back current prevention unit electrically connected to a charging terminal, when the charging terminal electrically connected to an external power, the back current prevention unit turned on by the logic control unit to turned off the discharging switch unit and the input voltage of the external power boosted by buck-boost unit and converted DC to AC by the full-bridge inverter. The coil of the wireless transmission unit provided the emission electricity with AC induction to achieve the purpose of wireless charging for the electronics while received the emission electricity of the wireless transmission unit.

13 Claims, 2 Drawing Sheets

BYPASS CONTROL WIRELESS CHARGING DEVICE

FIELD OF THE INVENTION

The present invention relates to a bypass control wireless charging device, and in particular to a bypass control wireless charging device which adopted the transmitting power supply mode by an external power source while connected to the external power source and departed from the power supplied by the battery. On the contrary, the battery transmitting mode was adopted while the external power source is not detected, and the battery provided the transmitting power for the wireless transmission unit.

BACKGROUND OF THE INVENTION

In the future, the wireless charging will be used everywhere with the growing popularity of the wireless charging. Although it is convenient to use the wireless charging everywhere, but the surge which generated from the initial charging by both of the wire or wireless charging may cause the cumulative damage to the battery to cumulatively reduce effective duration of the battery. In other words, the effective duration of the battery is reducing with the increasing numbers of charging, and the efficiency of discharging/charging of the battery becomes worse and worse. Therefore, the conventional wireless charging device uses battery to provide the transmitting power but easily to reduce the effective duration of the battery and the efficiency of supplying the transmitting power.

Thus, it is desired to provide a bypass control wireless charging device which adopted the transmitting power supply mode by an external power source while connected to the external power source and departed from the power supplied by the battery. On the contrary, the battery transmitting mode was adopted while the external power source is not detected, and the battery provided the transmitting power for the wireless transmission unit.

SUMMARY OF THE INVENTION

Main aspect of the present invention is to provide a bypass control wireless charging device which adopted the transmitting power supply mode by an external power source while connected to the external power source and departed from the power supplied by the battery.

Another aspect of the present invention is to provide a bypass control wireless charging device which the battery transmitting mode was adopted while the external power source is not detected, and the battery provided the transmitting power for the wireless transmission unit.

To achieve the above aspect, the present invention provides a bypass control wireless charging device, which comprises a logic control unit; a wireless transmission unit, electrically connecting to the logic control unit; a full-bridge inverter, electrically connecting to the logic control unit and the wireless transmission unit; a buck-boost unit, electrically connecting to the full-bridge inverter and the logic control unit; a discharging switch unit, having a battery terminal, a signal terminal, and output terminal, wherein the signal terminal electrically connecting to the logic control unit and the output terminal electrically connecting to the buck-boost unit; a battery, electrically connecting to the battery terminal of the discharging switch unit; a switch, electrically connecting to the battery terminal with one end thereof, and the other end of the switch electrically connecting to the signal terminal across a first diode; and a back current prevention unit, having a inlet terminal, a outlet terminal and a control terminal, wherein the inlet terminal electrically connecting to one end of a first resistance and a charging terminal, the other end of the first resistance electrically connecting to the logic control unit and one end of a second resistance and the other end of the second resistance is grounding, the outlet terminal electrically connecting to the discharging switch unit and the buck-boost unit therebetween, and the control terminal electrically connecting to the logic control unit.

When the charging terminal of the back current prevention unit electrically connected to an external power, the back current prevention unit turned on by the logic control unit to turned off the discharging switch unit, and input voltage of the external power boosted by buck-boost unit and converted DC (direct current) to AC (alternate current) by the full-bridge inverter, and across the induction coil of the wireless transmission unit provided emission electricity, and the opposite side of electronics received to the wireless transmission unit after the power of the transmitter in order to achieve the purpose of wireless charging, and thereby provide a bypass control wireless charging device which adopted the transmitting power supply mode by an external power source while connected to the external power source and departed from the power supplied by the battery. On the contrary, the battery transmitting mode was adopted while the external power source is not detected, and the battery provided the transmitting power for the wireless transmission unit.

BRIEF DESCRIPTION OF THE DRAWINGS

The present invention will be apparent to those skilled in the art by reading the following description of preferred embodiments thereof with reference to the drawings, in which.

DETAILED DESCRIPTION OF THE PREFERRED EMBODIMENTS

Figure 1:
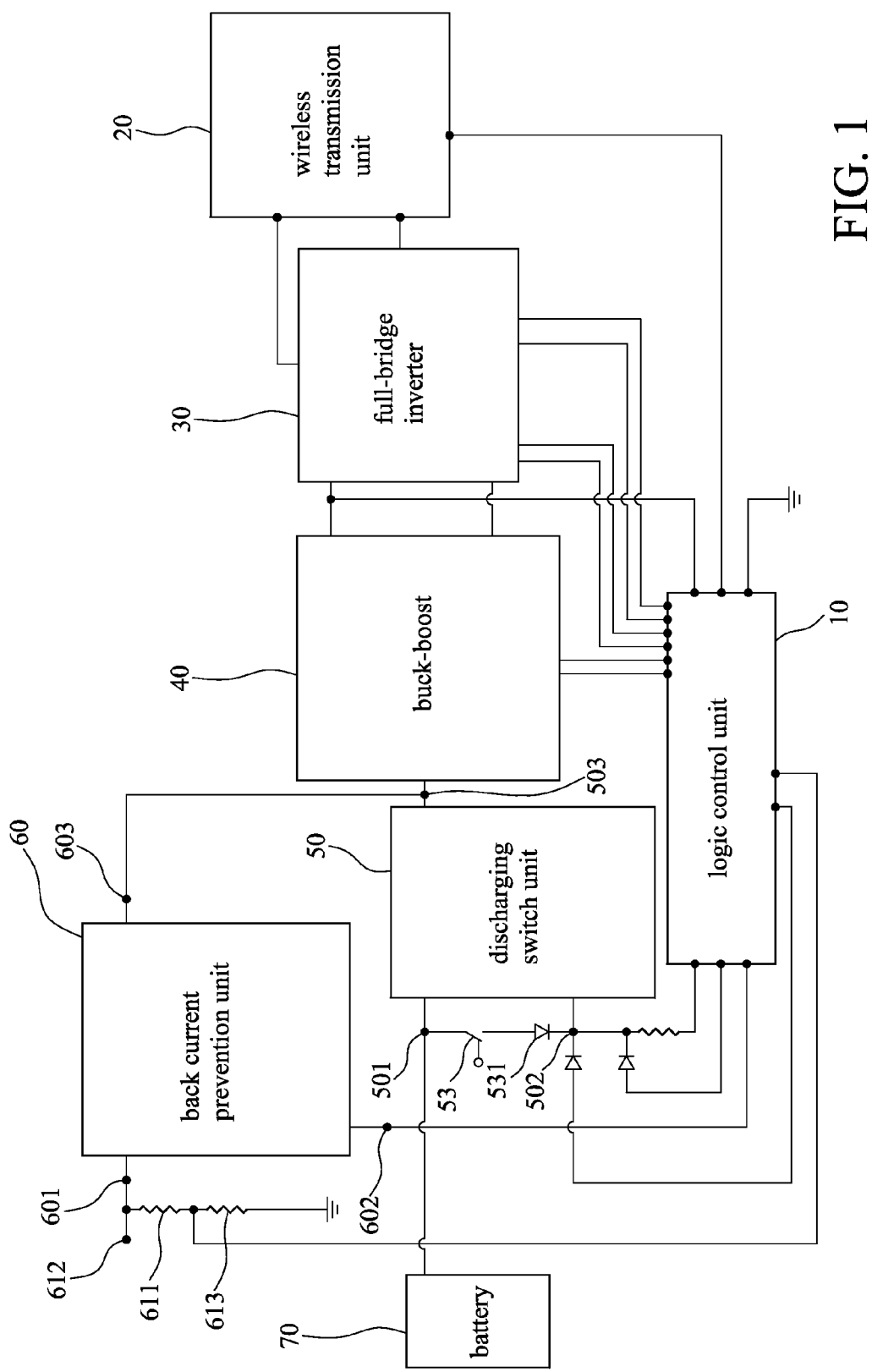
FIG. 1 is a block diagram of an embodiment of the present invention.
Figure 2:
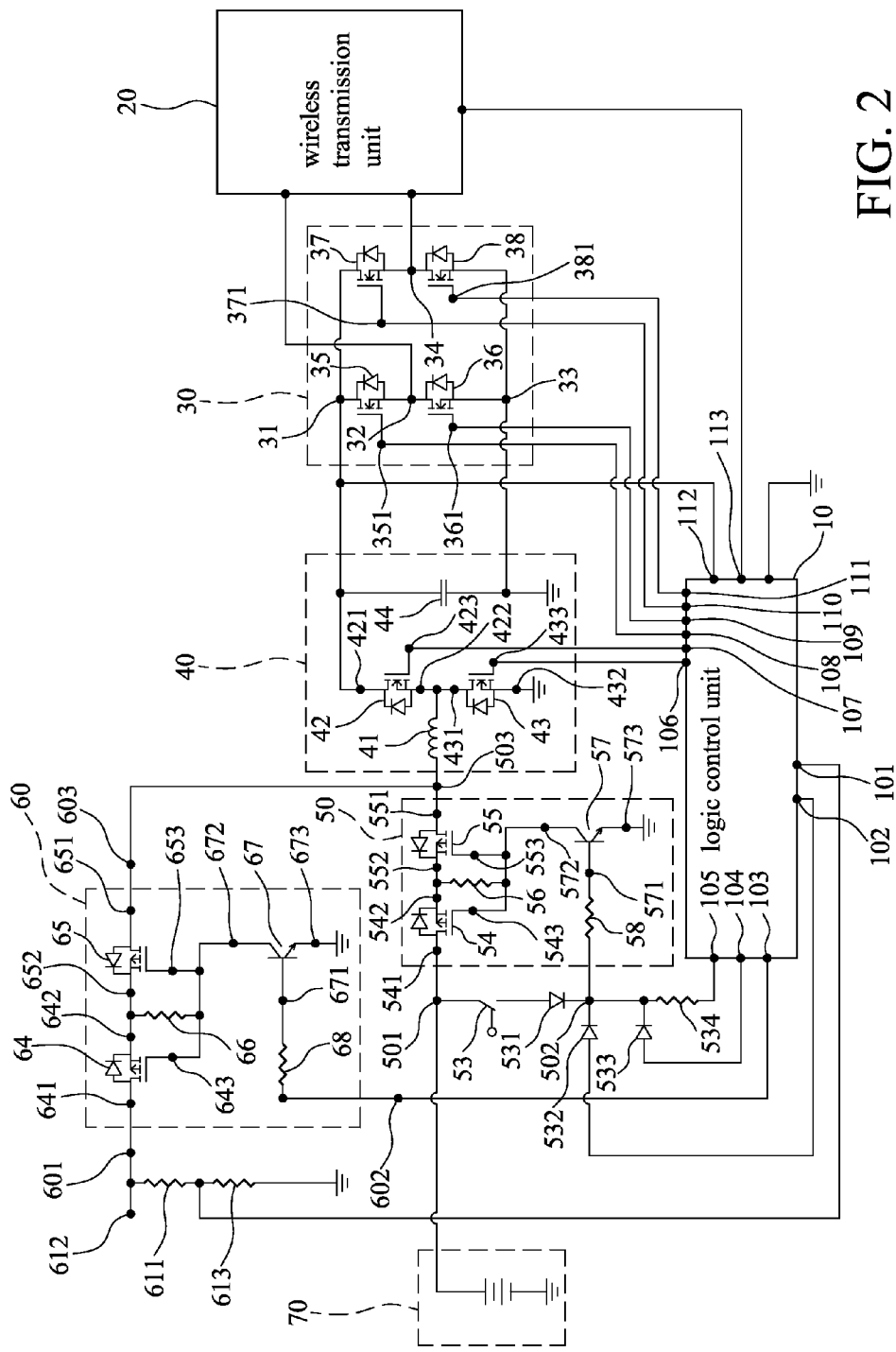
FIG. 2 is a circuit schematic diagram of an embodiment of the present invention.

With reference to the drawings and in particular to FIG. 1-2, the present invention is a bypass control wireless charging device, which comprises a logic control unit 10, a wireless transmission unit 20, a full-bridge inverter 30, a buck-boost unit 40, a discharging switch unit 50, a battery 70, a switch 53, and a back current prevention unit 60. The wireless transmission unit 20 electrically connects to the logic control unit 10. The full-bridge inverter 30 electrically connects to the logic control unit 10 and the wireless transmission unit 20. The buck-boost unit 40 electrically connects to the full-bridge inverter 30 and the logic control unit 10. The discharging switch unit 50 has a battery terminal 501, a signal terminal 502, and an output terminal 503, wherein the signal terminal 502 electrically connects to the logic control unit 10 and the output terminal 503 electrically connects to the buck-boost unit 40. The battery 70 electrically connects to the battery terminal 501 of the discharging switch unit 50. One end of the switch 53 electrically connects to the battery terminal 501 and the other end of the switch 53 electrically connects to the signal terminal 502 across a first diode 531, wherein the switch 53 is an automatic self-reset switch in the present embodiment. The back current prevention unit 60 has a inlet terminal 601, a outlet terminal 603 and a control terminal 602, wherein the inlet terminal 601 electrically connects to one end of a first resistance 611 and a charging terminal 612 and the charging terminal 612 of the back current prevention unit 60 further electrically connects to an external power in the present embodiment (not shown in FIG. 1 and FIG. 2). The other end of the first resistance 611 electrically connects to the logic control unit 10 and one end of a second resistance 613 and the other end of the second resistance 613 is grounding. The outlet terminal 603 electrically connects to the discharging switch unit 50 and the buck-boost unit 40 therebetween, and the control terminal 602 electrically connects to the logic control unit 10.

When the charging terminal 612 of the back current prevention 60 unit electrically connects to the external power, the back current prevention 60 unit is turned on by the logic control unit 10 to turn off the discharging switch unit 50, and the input voltage of the external power boost by buck-boost unit 40 and convert DC to AC by the full-bridge inverter 30. The coil of the wireless transmission unit 20 provides the emission electricity with AC induction to achieve the purpose of wireless charging for the electronics while receives the emission electricity of the wireless transmission unit 20.

Furthermore, the back current prevention unit 60 further comprises a first transistor 64, a second transistor 65, a third resistance 66, a first bipolar junction transistor 67 and a fourth resistance 68. Both of the first transistor 64 and the second transistor 65 have a drain terminal 641, 651, a source terminal 642, 652 and a gate terminal 643, 653. One end of the third resistance 66 electrically connects to the source terminal 642 of the first transistor 64 and the source terminal 652 of the second transistor 65, and the other end of the third resistance 66 electrically connects to the bipolar junction transistor 67 and the gate terminal 643 of the first transistor 64 and the gate terminal 653 of the second transistor 65. The first bipolar junction transistor 67 comprises a collecting terminal 672, an emitter terminal 673 and a base terminal 671, wherein the collecting terminal 672 connects to the other end of the third resistance 66 electrically and the emitter terminal 673 is grounding. The base terminal 671 electrically connects to the logic control unit 10 across the fourth resistance 68, wherein each of the first transistor 64 and the second transistor 65 is a metal oxide semiconductor field effect transistor.

The discharging switch unit 50 comprises a third transistor 54, a fourth transistor 55, a fifth resistance 56, a sixth resistance 58, a second bipolar junction transistor 57, and both of the third transistor 54 and the fourth transistor 55 have a drain terminal 541, 551, a source terminal 542, 552 and a gate terminal 543, 553. One end of the fifth resistance 56 electrically connects to the source terminal 542 of the third transistor 54 and the source terminal 552 of the fourth transistor 55, and the other end of the fifth resistance 56 electrically connects to the second bipolar junction transistor 57 and the gate terminal 543 of the third transistor 54 and the gate terminal 553 of the fourth transistor 55. The second bipolar junction transistor 57 comprises a collecting terminal 572, an emitter terminal 573 and a base terminal 571, wherein the collecting terminal 572 electrically connects to the other end of the fifth resistance 56 and the emitter terminal 573 is grounding. The base terminal 571 electrically connects to the signal terminal 502 across the sixth resistance 58, wherein each of the third transistor 54 and the fourth transistor 55 is a metal oxide semiconductor field effect transistor.

The buck-boost unit 40 comprises an inductor 41, a fifth transistor 42, a sixth transistor 43 and a capacitor 44, wherein one end of the inductor 41 electrically connects to the back current prevention unit 60 and the discharging switch unit 50 and the other end of the inductor 41 electrically connects to the fifth transistor 42 and the sixth transistor 43 therebetween.

The fifth transistor 42 has a drain terminal 421, a source terminal 422, and a gate terminal 423. The sixth transistor 43 has a drain terminal 431, a source terminal 432 and a gate terminal 433. The source terminal 422 of the fifth transistor 42 electrically connects to the drain terminal 431 of the sixth transistor 43, and the drain terminal 421 of the fifth transistor 42 electrically connects to one end of the capacitor 44 and the full-bridge inverter 30. The other end of the capacitor 44 is grounding. Each of the fifth transistor 42 and the sixth transistor 43 is a metal oxide semiconductor field effect transistor.

The full-bridge inverter 30 comprises a first pin 31, a second pin 32, a third pin 33 and a fourth pin 34, wherein the first pin 31 electrically connects to the buck-boost unit 40, and the second pin 32 and the fourth pin 34 electrically connects to the wireless transmission unit 20, and the third pin 33 is grounding. The full-bridge inverter 30 further comprises a seventh transistor 35, an eighth transistor 36, a ninth transistor 37 and a tenth transistor 38, and each of the seventh transistor 35, the eighth transistor 36, the ninth transistor 37 and the tenth transistor 38 has a gate terminal 351, 361, 371, 381 which electrically connects to the logic control unit 10, wherein each of the seventh transistor 35, the eighth transistor 36, the ninth transistor 37 and the tenth transistor 38 is a metal oxide semiconductor field effect transistor.

The logic control unit 10 comprises a detective terminal 101, a digital signal control terminal 102, a back current prevention signal terminal 103, a transmitter maintain terminal 104, a transmitting identifying terminal 105, a first pulse width modulation control terminal 106, a second pulse width modulation control terminal 107, a first control terminal 108, a second control terminal 109, a third control terminal 110, a fourth control terminal 111, a voltage terminal 112 and a transmitting signal terminal 113, wherein the detective terminal 101 electrically connects to one end of the first resistance 611 and one end of the second resistance 613, and the digital signal control terminal 102 electrically connects to the signal terminal 502 across a second diode 532. The back current prevention signal terminal 103 electrically connects to the control terminal 602 of the back current prevention unit 60, and the transmitter maintain terminal 104 electrically connects to the signal terminal 502 of the discharging switch unit 50 across a third diode 533. The transmitting identifying terminal 105 electrically connects to the signal terminal 502 of the discharging switch unit 50 across a seventh resistance 534, and the first pulse width modulation control terminal 106 and the second pulse width modulation control terminal 107 electrically connects to the buck-boost unit 40. The first control terminal 108, the second control terminal 109, the third control terminal 110 and the fourth control terminal 111 electrically connects to the full-bridge inverter 30 sequentially and the voltage terminal 112 electrically connects to the full-bridge inverter 30 and the buck-boost unit 40 therebetween, and the transmitting signal terminal 113 electrically connects to the wireless transmission unit 20.

The transmitting mode which is provided by the bypass control wireless charging device of present invention includes a battery transmitting mode and a transmitting power supply mode. The transmitting power supply mode is adopted while connects to an external power source and departed from the power supplied by the battery 70. On the contrary, the battery transmitting mode is adopted while the external power source is not detected, and the battery 70 provides the transmitting power for the wireless transmission unit 20.

When the battery transmitting mode is adopted, the discharging switch unit 50 is switched by pressing the switch 53 or by sending a signal from the back current prevention signal terminal 103 of the logic control unit 10. When the switch 53 is pressed to switch the discharging switch unit 50 into battery transmitting mode that is identified by the logic control unit 10, the discharging switch unit 50 is electrify and connects to the voltage terminal 112 of the logic control unit 10 across the fifth transistor 42 of the buck-boost unit 40 to provide electric power to the logic control unit 10.

When the battery transmitting mode is identified by the logic control unit 10, the battery transmitting mode is kept by the transmitter maintain terminal 104 of the logic control unit 10 which is controlled by the third diode 533, and continuously provides the transmitting signal to the transmitting identifying terminal 105 to keeps in the transmitting state.

The transmitting signal terminal 113 of the logic control unit 10 detects whether a electronics is exist or not for charging on the opposite side of the wireless transmission unit 20 with an antenna. If the electronics is not detected, the logic control unit 10 stops transmitting. The detection is to detect whether a loading is exist or not at the opposite side of the wireless transmission unit 20 by the transmitting signal terminal 113. The wireless transmission unit 20 stops transmitting without the loading. If the wireless transmission unit 20 detects the loading, the logic control unit 10 sends a signal from the first pulse width modulation control terminal 106 and the second pulse width modulation control terminal 107 to switch on the fifth transistor 42 and the sixth transistor 43 of the buck-boost unit 40. The fifth transistors 42 and the six transistors 43 continuously switches the ON/OFF state at a high frequency by the signal which is sent from the first pulse width modulation control terminal 106 and the second pulse width modulation control terminal 107. When the fifth transistors 42 turns off and the six transistors 43 turns on, the electricity of the battery 70 goes through the discharging switch unit 50, the inductor 41 of the buck-boost unit 40, and the sixth transistor 43 to charge the inductor 41 since one end of the six transistor 43 and the battery 70 are grounding and forms a circuit loop. When the fifth transistors 42 turns on and the six transistors 43 and turns off, the electricity of the battery 70 goes through the inductor 41 and the fifth transistor 42 to discharge the inductor 41, and sends direct current to the capacitor 44. The direct current is a current which is synchronous rectified and boosted, and transforms into alternating current by the full-bridge inverter 30 to provide the alternating current to the wireless charging unit 20 to generate the transmitting power.

In other words, the inductor 41 is charged by the switching of the fifth transistor 42 and the six transistors 43. In order to achieve the purpose of wireless charging, the direct current is synchronous rectified and boosted which is stored in the capacitor 44, and the direct current is transformed into alternating current by the full-bridge inverter 30 to provide the alternating current to the wireless charging unit 20 to generate the transmitting power which is received by the electronics at the opposite side.

While the transmitting power supply mode is adopted, the charging terminal 612 of the back current prevention unit 60 electrically connects to the external power and the detective terminal 101 of the logic control unit 10 detects the external power to switch the bypass control wireless charging device of present invention into the transmitting power supply mode. Now the digital signal control terminal 102 of the logic control unit 10 sends a signal to turn off the discharging switch unit 50 for preventing the discharging of the battery, and turn on the back current prevention unit 60 to provide the electric power of the external power to the buck-boost unit 40, wherein the electric power of the external power is synchronously boosted and rectified by the buck-boost unit 40, and then transforms the direct current into the alternating current by the full-bridge inverter 30 to provide the alternating current to the wireless transmission unit 20 to generate the transmitting power.

The transmitting signal terminal 113 of the logic control unit 10 detects the opposite side of the wireless transmission unit 20 with an antenna whether a electronics is exist or not. If the logic control unit 10 does not detect the electronics, then the logic control unit 10 stops the transmitting. The detection is used to detect whether a loading exist or not at the opposite side of the wireless transmission unit 20 by the transmitting signal terminal 113. The wireless transmission unit 20 then stops the transmitting without loading. If the wireless transmission unit 20 detects the loading, the logic control unit 10 sends a signal to switch on the fifth transistor 42 and the sixth transistor 43 of the buck-boost unit 40 by the first pulse width modulation control terminal 106 and the second pulse width modulation control terminal 107. The fifth transistors 42 and the six transistors 43 continuously switches the ON/OFF state at a high frequency by the signal which is sent from the first pulse width modulation control terminal 106 and the second pulse width modulation control terminal 107. When the fifth transistors 42 turns off and the six transistors and 43 turns on, the electricity of the battery 70 goes through the discharging switch unit 50, the inductor 41 of the buck-boost unit 40, and the sixth transistor 43 to charge the inductor 41 since one end of the six transistor 43 and the battery 70 are grounding and forms a circuit loop. When the fifth transistors 42 turns on and the six transistors 43 and turns off, the electricity of the battery 70 goes through the inductor 41 and the fifth transistor 42 to discharge the inductor 41, and sends direct current to the capacitor 44. The direct current is a current which is synchronous rectified and boosted, and transforms into alternating current by the full-bridge inverter 30 to provide the alternating current to the wireless charging unit 20 to generate the transmitting power.

In other words, the inductor 41 is charged by the switching of the fifth transistor 42 and the six transistors 43. In order to achieve the purpose of wireless charging, the direct current is synchronous rectified and boosted which is stored in the capacitor 44, and the direct current is transformed into alternating current by the full-bridge inverter 30 to provide the alternating current to the wireless charging unit 20 to generate the transmitting power which is received by the electronics at the opposite side.

The features of present invention which has been described above are summarized as follows: (1.) The bypass control wireless charging device of present invention Increase the effective duration of the battery, while connects to an external power source and the transmitting power supply mode is adopted, the bypass control wireless charging device is departed from the power supplied by the battery. On the contrary, the battery transmitting mode is adopted while the external power source is not detected, and the battery provided the transmitting power for the wireless transmission unit; (2.) The bypass control wireless charging device of present invention is used as a mobile power outdoor, and the electronics at the opposite side receives transmitting power of the wireless transmission unit to achieve the purpose of wireless charging; (3.) The external power directly provides the transmitting power to the wireless transmission unit to increase the electricity efficiency.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A bypass control wireless charging device, comprising:
   a logic control unit;
   a wireless transmission unit, electrically connecting to the logic control unit;
   a full-bridge inverter, electrically connecting to the logic control unit and the wireless transmission unit;
   a buck-boost unit, electrically connecting to the full-bridge inverter and the logic control unit;
   a discharging switch unit, having a battery terminal, a signal terminal, and output terminal, wherein the signal terminal electrically connecting to the logic control unit and the output terminal electrically connecting to the buck-boost unit;
   a battery, electrically connecting to the battery terminal of the discharging switch unit;
   a switch, electrically connecting to the battery terminal with one end thereof, and the other end of the switch electrically connecting to one end of a first diode and another end of the first diode electrically connecting to the signal terminal of the discharging switch unit, wherein the signal terminal electrically connects to the logic control unit; and
   a back current prevention unit, having a inlet terminal, a outlet terminal and a control terminal, wherein the inlet terminal electrically connecting to one end of a first resistance and a charging terminal, the other end of the first resistance electrically connecting to the logic control unit and one end of a second resistance and the other end of the second resistance is grounding, the outlet terminal electrically connecting to the discharging switch unit and the buck-boost unit therebetween, and the control terminal electrically connecting to the logic control unit.

2. The bypass control wireless charging device as claimed in claim 1, wherein the back current prevention unit further comprising a first transistor, a second transistor, a third resistance, a first bipolar junction transistor and a fourth resistance, each of the first transistor and the second transistor having a drain terminal, a source terminal and a gate terminal, one end of the third resistance electrically connecting to the source terminal both of the first transistor and the second transistor, and the other end of the third resistance electrically connecting to the bipolar junction transistor and gate terminal both of the first transistor and the second transistor, and the first bipolar junction transistor comprising a collecting terminal, an emitter terminal and a base terminal, and the other end of the third resistance electrically connecting to the collecting terminal, the emitter terminal is grounding, the base terminal electrically connecting to the logic control unit across the fourth resistance.

3. The bypass control wireless charging device as claimed in claim 2, wherein each of the first transistor and the second transistor is a metal oxide semiconductor field effect transistor respectively.

4. The bypass control wireless charging device as claimed in claim 1, wherein the discharging switch unit further comprising a third transistor, a fourth transistor, a fifth resistance, a sixth resistance, a second bipolar junction transistor, and each of the third transistor and the fourth transistor having a drain terminal, a source terminal and a gate terminal, one end of the fifth resistance electrically connecting to the source terminal of the third transistor and the fourth transistor, and the other end of the fifth resistance electrically connecting to the second bipolar junction transistor and the gate terminal of the third transistor and the fourth transistor, and the second bipolar junction transistor comprising a collecting terminal, a emitter terminal and a base terminal, and the collecting terminal electrically connecting to the other end of the fifth resistance, the emitter terminal is grounding, the base terminal electrically connecting to the signal terminal across the sixth resistance.

5. The bypass control wireless charging device as claimed in claim 4, wherein each of the third transistor and the fourth transistor is a metal oxide semiconductor field effect transistor respectively.

6. The bypass control wireless charging device as claimed in claim 1, wherein the buck-boost unit further comprising an inductor, a fifth transistor, a sixth transistor and a capacitor, and one end of the inductor electrically connecting to the back current prevention unit and the discharging switch unit, and the other end of the inductor electrically connecting to the fifth transistor and the sixth transistor therebetween, and each of the fifth transistor and the sixth transistor having a drain terminal, a source terminal and a gate terminal, the source terminal of the fifth transistor electrically connecting to the drain terminal of the sixth transistor, and the drain terminal of the fifth transistor electrically connecting to one end of the capacitor and the full-bridge inverter, and the other end of the capacitor is grounding.

7. The bypass control wireless charging device as claimed in claim 6, wherein each of the fifth transistor and the sixth transistor is a metal oxide semiconductor field effect transistor.

8. The bypass control wireless charging device as claimed in claim 1, wherein the full-bridge inverter comprising a first pin, a second pin, a third pin and a fourth pin, wherein the first pin electrically connecting to the buck-boost unit, and the second pin and the fourth pin electrically connecting to the wireless transmission unit, and the third pin is grounding.

9. The bypass control wireless charging device as claimed in claim 8, wherein the full-bridge inverter further comprising a seventh transistor, an eighth transistor, a ninth transistor and a tenth transistor, and each of the seventh transistor, the eighth transistor, the ninth transistor and the tenth transistor having a gate terminal in which electrically connecting to the logic control unit.

10. The bypass control wireless charging device as claimed in claim 9, wherein each of the seventh transistor, the eighth transistor, the ninth transistor and the tenth transistor is a metal oxide semiconductor field effect transistor.

11. The bypass control wireless charging device as claimed in claim 1, wherein the logic control unit comprising a detective terminal, a digital signal control terminal, a back current prevention signal terminal, a transmitter maintain terminal, a transmitting identifying terminal, a first pulse width modulation control terminal, a second pulse width modulation control terminal, a first control terminal, a second control terminal, a third control terminal, a fourth control terminal, a voltage terminal and a transmitting signal terminal, wherein the detective terminal electrically connecting to each end of the first resistance and the second resistance, and the digital signal control terminal electrically connecting to the signal terminal across a second diode, and the back current prevention signal terminal electrically connecting to the control terminal of the back current prevention unit, and the transmitter maintain terminal electrically connecting to the signal terminal of the discharging switch unit across a third diode, and the transmitting identifying terminal electrically connecting to the signal terminal of the discharging switch unit across a seventh resistance, and the first pulse width modulation control terminal and second pulse width modulation control terminal electrically connecting to the buck-boost unit, and the first control terminal, the second control terminal, the third control terminal and the fourth control terminal electrically connecting to the full-bridge inverter sequentially, and the voltage terminal electrically connecting to the full-bridge inverter and the buck-boost unit therebetween, and the transmitting signal terminal electrically connecting to the wireless transmission unit.

12. The bypass control wireless charging device as claimed in claim 1, wherein the charging terminal of the back current prevention unit further electrically connecting to an external power.

13. The bypass control wireless charging device as claimed in claim 1, wherein the switch is an automatic self-reset switch.

\* \* \* \* \*